United States Patent [19]

Spurling

[11] Patent Number: 4,982,929
[45] Date of Patent: Jan. 8, 1991

[54] SAFETY VALVE COUPLING

[76] Inventor: Daniel P. Spurling, c/o Eastern Industrial Products, P.O. Box 1150, Pembroke, Mass. 02359

[21] Appl. No.: 489,046

[22] Filed: Mar. 6, 1990

[51] Int. Cl.⁵ ............................................. F16L 37/28
[52] U.S. Cl. .................................. 251/149.9; 251/89.5
[58] Field of Search ........................... 251/149.9, 89.5; 137/614.06, 637.1

[56] References Cited

U.S. PATENT DOCUMENTS

| 3,664,634 | 5/1972 | Guertin et al. | 137/614.06 |
| 4,102,356 | 7/1978 | Knicht | 137/614.06 |
| 4,103,712 | 8/1978 | Fletcher et al. | 251/149.9 |
| 4,135,551 | 1/1979 | Knight et al. | 137/614.06 |

Primary Examiner—A. Michael Chambers
Attorney, Agent, or Firm—M. Lawrence Oliverio

[57] ABSTRACT

Apparatus for preventing fluid flow upon decoupling of first and second fluid delivery tubes, wherein the first fluid delivery tube includes a reception outlet and the second fluid delivery tube includes an insertion outlet for insertion and coupling within the reception outlet, the reception outlet including a pair of arms pivotable outwardly from the reception outlet for decoupling the outlets and pivotable inwardly for coupling the outlets, one of the fluid delivery tubes including a valve for opening and closing the one tube to fluid flow, the apparatus comprising a pair of ears mounted to the one tube including the valve, the valve including a handle pivotable between valve open and valve closed positions, the ears being pivotably mounted to the one tube including the valve for pivotable movement between a position interfering with pivoting of the arms and a position of noninterference with pivoting of the arms, the ears being connected to the handle of the valve such that when the ears are pivoted to the position of interference the valve is simultaneously pivoted to the open position and when the ears is pivoted to the noninterference position the handle is simultaneously pivoted to the closed position.

19 Claims, 3 Drawing Sheets 4,982,929

SAFETY VALVE COUPLING

BACKGROUND OF THE INVENTION

The present invention relates to safety valve devices for preventing decoupling of fluid delivery tubes and in particular to apparati for preventing fluid flow through coupled fluid delivery tubes except when the delivery tubes are coupled together.

SUMMARY OF THE INVENTION

In accordance with the invention there is provided an apparatus for preventing fluid flow upon decoupling of first and second fluid delivery tubes, wherein the first fluid delivery tube includes a reception outlet and the second fluid delivery tube includes an insertion outlet for insertion and coupling within the reception outlet, the reception outlet including a pair of arms pivotable outwardly from the reception outlet for decoupling the outlets and pivotable inwardly for coupling the outlets, one of the fluid delivery tubes including a valve for opening and closing the one tube to fluid flow, the apparatus comprising a pair of ears mounted to the one tube including the valve, the valve including a handle pivotable between valve open and valve closed positions, the ears being pivotably mounted to the one tube including the valve for pivotable movement between a position interfering with pivoting of the arms and position of noninterference with pivoting of the arms, the ears being connected to the handle of the valve such that when the ears are pivoted to the position of interference the valve is simultaneously pivoted to the open position and when the ears are pivoted to the noninterference position the handle is simultaneously pivoted to the closed position.

The ears typically comprise a pair of rigid shields connected to each other by a yoke, the yoke being manually actuatable for simultaneous pivoting of the shields and the handle. The shields typically include flat inside surfaces and are mounted such that upon pivoting of the ears to the interfering position the flat inside surfaces of the ears are disposed closely adjacent the outside surfaces of the arms when the arms are pivoted inwardly to a coupling position.

The shields are contoured such that the shields gradually move during pivoting of the handle between interfering and noninterfering positions. Most preferably the first fluid tube which includes the arms also includes the reception outlet, the valve means and the ears.

The arms are typically pivotable within a first plane and the ears are pivotable within second plane(s) substantially perpendicular to the first plane.

Most preferably the apparatus further comprises a mechanism for locking the handle in the valve open position, and the mechanism for locking comprises a pin manually slidable into and out of a locking aperture.

DETAILED DESCRIPTION OF PREFERRED EMBODIMENTS

Figure 1:
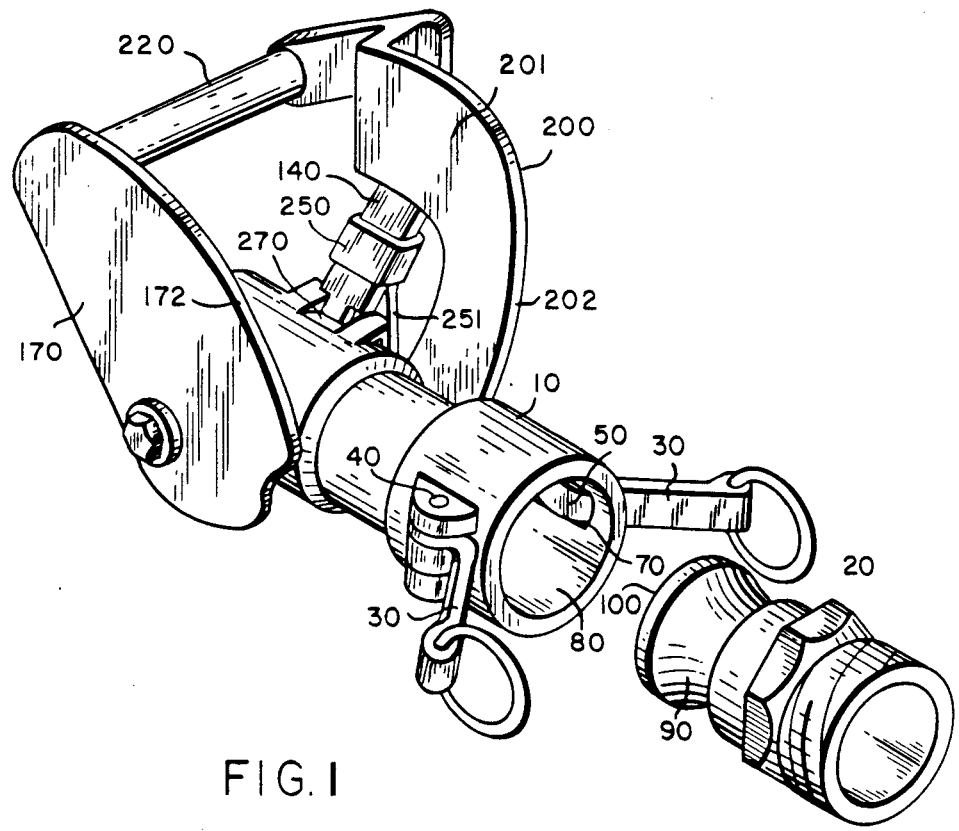
FIG. 1 is a side isometric view of a safety valve coupling/decoupling device according to the invention shown incorporated into the outlet end of fluid delivery tube with the safety device shown pivoted in a noninterfering, valve closed position.
Figure 2:
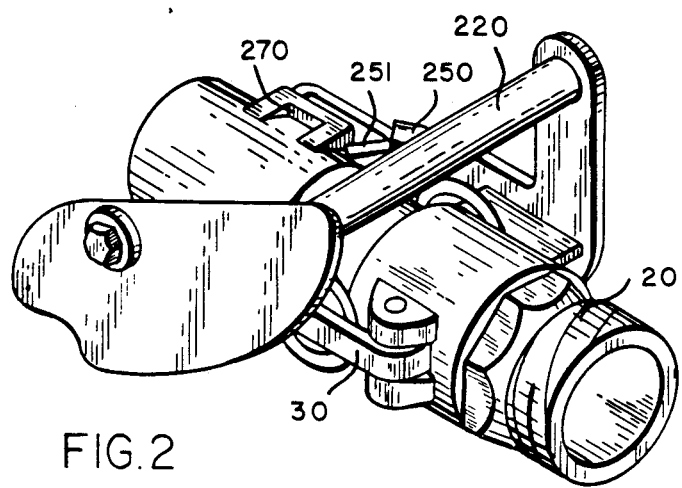
FIG. 2 is a side isometric view of the apparatus shown in FIG. 1, showing a pair of fluid delivery tube outlets coupled together with the safety device of FIG. 1 pivoted in an interfering, valve open position.
Figure 3:
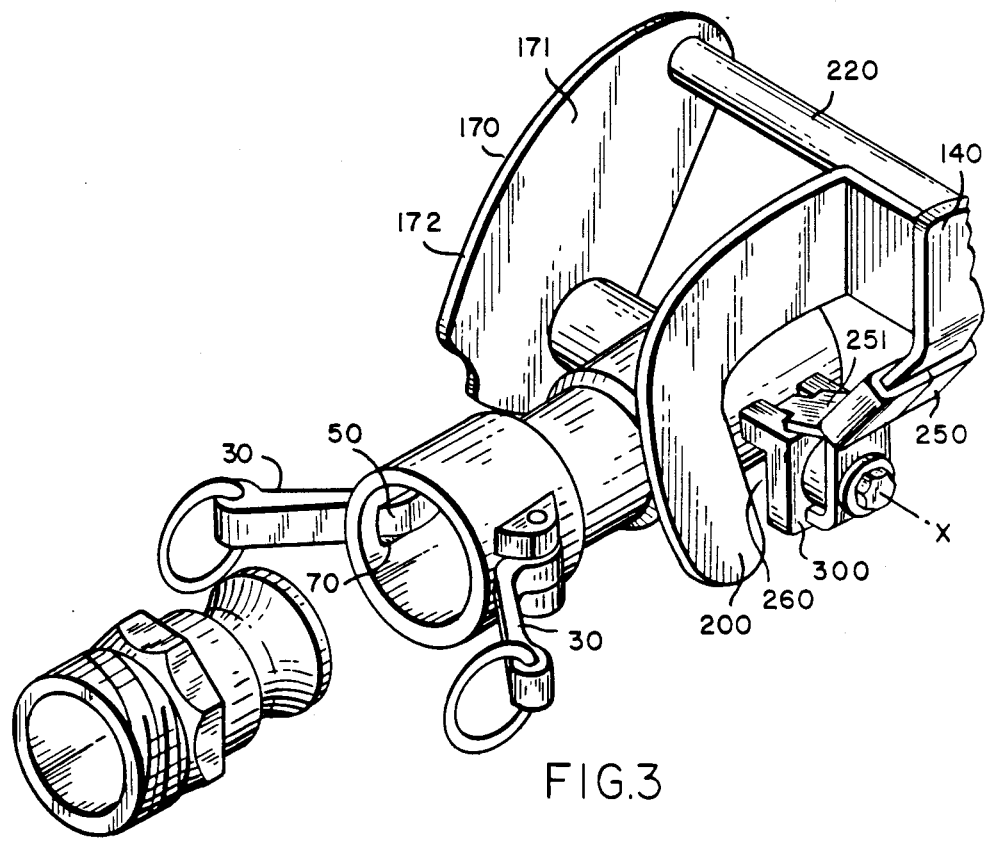
FIG. 3 is an opposite side isometric view of FIG. 1 apparati showing a locking mechanism maintaining the safety device in a noninterfering, valve closed position.
Figure 4:
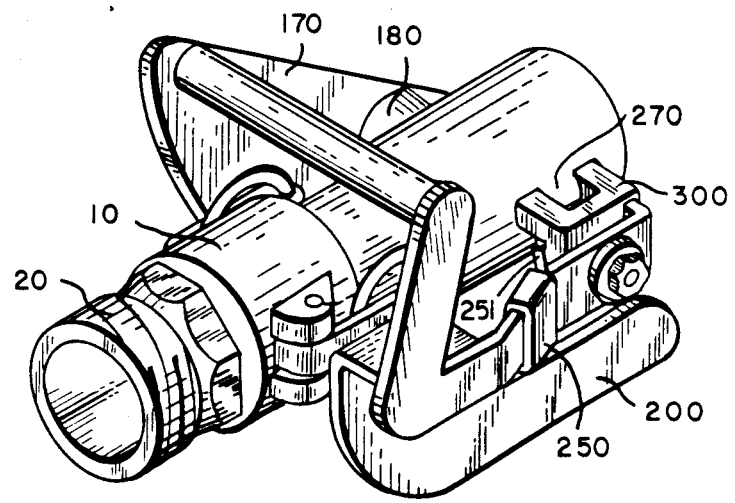
FIG. 4 is an opposite side isometric view of FIG. 2 apparati showing a locking mechanism maintaining the safety device in an interfering, valve open position.

There is shown in FIG. 1 the outlet ends 10, 20 for a pair of fluid delivery tubes (not shown). As shown one outlet 10 includes an aperture for receiving the other outlet 20 in the manner shown in FIGS. 2, 4, 5. The reception outlet 10 includes a pair of arm 30 pivotally mounted on opposite sides of the outlet 10 by conventional pin 40 and aperture mechanism such that a cammed surface end 50, FIGS. 1, 3, 5, of the arms 30 extends through appropriate aperture 70 provided in the wall 60, FIG. 5, of the outlet 10. The cammed ends 50 are provided with a profile selected to recede behind the interior surface 80 of the outlet 10 when the arms 30 are pivoted to the decoupling position as shown in FIGS. 1, 3. The profile of the cammed ends 50 is further selected to enable the ends 50 to gradually protrude beyond the inside surface 80 and into the interior space of the outlet 10 to a maximum protrusion position as shown in FIG. 5 when the arms 30 are pivoted to their coupling position as shown in FIGS. 2, 4, 5.

Figure 5:
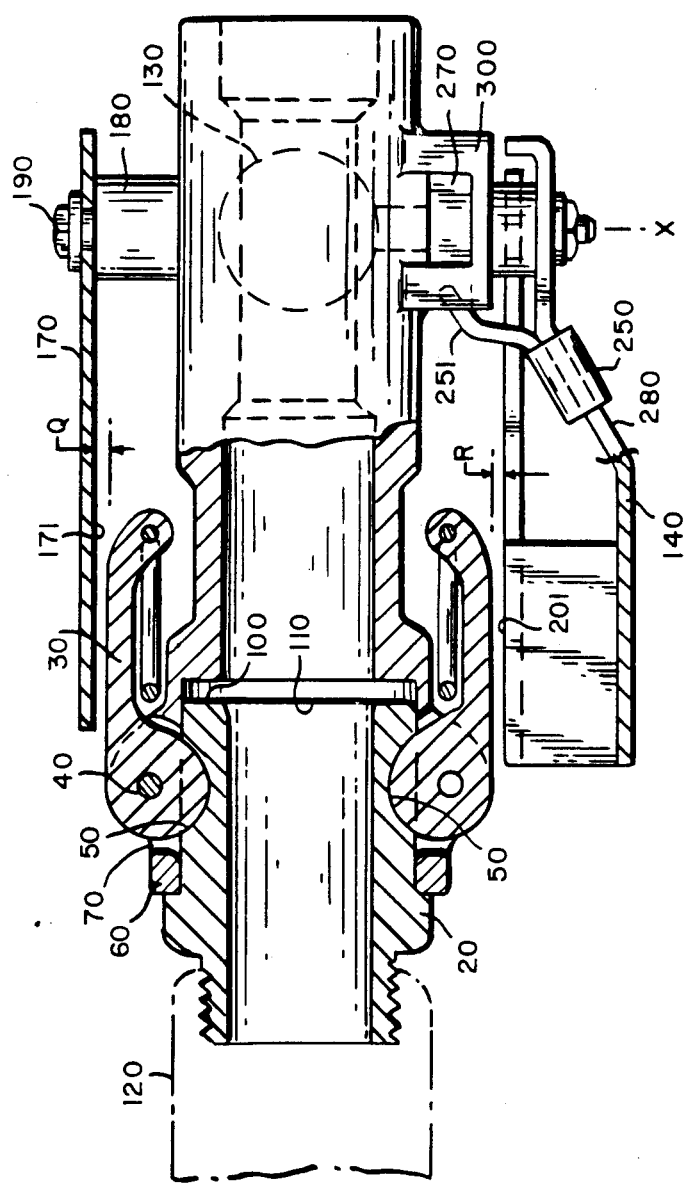
FIG. 5 is a top, partial cross-sectional view of FIG. 2 showing the positioning of the interference components of the safety device relative to a pair of coupling arms for coupling the outlet ends of fluid delivery tubes.

The outlet end 20 of the insertion tube 120, FIG. 5, includes an appropriate mechanism such as a groove 90 for coupling with the cammed ends 50 of the arms 30. Typically the coupling between surfaces 50 and groove 90 is such that outlet 20 and outlet 10 are sealably coupled such that fluid flowing through the central bores or passages of the outlets 10, 20 will not leak through the coupled outlets 10, 20. Preferably the profile of the cammed surfaces 50 are selected to exert enough axially directed force on groove 90 (when arms 30 are in their coupling position, FIGS. 2, 4, 5) to pressure fit the end surface 100 of outlet 20 against a complementary mating surface 110 of outlet 10 to prevent fluid leakage therebetween, FIGS. 1, 5.

A conventional fluid valve mechanism 130 is provided for opening and closing the central fluid passage of outlet 10 to fluid flow. Valve 130 may comprise any conventional fluid control valve such as a ball valve which is connected, for example, to a handle 140 for manual turning of the valve 130 between open and closed positions. As shown in FIGS. 1-5, the handle 140 is connected to a pair of ears 170, 200. The ears 170, 200 are pivotable up and down simultaneously around axis X with handle 140. As shown one shield 170 is pivotably mounted via conventional cylinder 180 and bolt 190 mechanisms and the other shield 200 is similarly pivotably mounted by virtue of its connection to handle 140.

As shown in FIGS. 1, 3, the handle 140 is in a valve closed position. Similarly the ears 170, 200 are in a noninterfering position when the valve 130 and handle are in a closed position as described more fully below.

When the two outlets 10, 20 are coupled and the arms 30 are pivoted to their coupling position as shown in FIGS. 2, 4, 5, the ears 170, 200 are pivotable to a position as shown in FIGS. 2, 4, 5 whereby the inside surfaces 171, 201 of the shields 170, 200 are closely spaced away from the outside surfaces of the arms 30 and interfere with outward movement of the arms 30 in the plane in which the arms 30 may otherwise pivot. Pivoting of the ears 170, 200 to an interfering position such as the position shown in FIGS. 2, 4, 5 results in simultaneous pivoting of handle 140 to a valve open position.

The ears 170, 200 each have a back to front profile 172, 202 selected such that as the handle 140 is pivoted from the position shown in FIGS. 2, 4, 5 backwardly to a position such as shown in FIGS. 1, 3 the shields 170, 200 do not reach a position of noninterference until the valve 130 is closed. Thus, the arms 30 cannot be pivoted to a position whereby the outlets 10, 20 may be uncoupled until the handle 140 is pivoted to at least some position where the valve 130 is closed.

As shown in the embodiment of FIGS. 1-5, shield 170 is connected to handle 140 and shield 200 by a yoke 220 provided for ready manual actuatability. As shown in the Figures, the shields 170, 200 pivot up and down, i.e. in a plane(s) perpendicular to the plane(s) in which the arms 30 pivot.

In a most preferred embodiment where the shields 170, 200, handle 140 and valve 130 are incorporated into the sam structure as the outlet which includes the arms 30, the shields 170, 200 are mounted so as to pivot in a plane(s) substantially perpendicular to the plane in which the arms 30 pivot. However, even where the outlets 10, 20 may be coupled such that the arms 30 pivot in a plane which lies between plus or minus about 45 degrees relative to the plane(s) in which the shields 170, 200 pivot, the shields 170, 200 will effectively prevent the arms 30 from being pivoted to an uncoupling position until the handle 140 has been pivoted to a substantially valve cloud position by virtue of the selected contour(s), thickness(es) and spacing(s), Q, R, FIG. 5 of the shields 170. Typically the spacing(s) Q, R, are selected to be in the range of about 0.1 to about 1 inch.

In a most preferred embodiment the safety apparatus includes a lock mechanism 250, 251 comprising a sleeve 250 and a pin 251 attached to the sleeve 250. As shown in FIGS. 1, 3 the locking pin 251 is configured such that it is insertable into a valve closed lock aperture 270 provided in a lockinglblock 300, FIGS. 1, 3, 4, 5. The sleeve 250 is slidable up and down along an angled portion 280 of handle 140 such that the pin may be manually slid in and out of valve closed aperture 270 to lock or unlock handle 140, and shields 170, 200 into or out of a valve closed position Inasmuch as the valve 130 may be opened once the outlets 10, 20 are already decoupled, the locking mechanisms 250, 251, 270, 300 provide a mechanism which the user must positively actuate to open the valve thus providing some amount of insurance against accidental opening of the valve 130. Similarly, the locking block 300 is provided with a valve closed lock aperture 260, FIG. 3, whereby the handle 140 and shields 170, 200 may be locked in a valve open position as shown in FIGS. 2, 4, 5 by sliding the pin 251 into aperture 260.

As shown in the Figures, the valve 130 and accompanying handle 140, shields 170, 220, yoke 250 and pivot mechanisms 180 and the like are incorporated into a unitary structure with reception outlet 10. In alternative embodiments such mechanisms may be incorporated into a structure united with outlet 20.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for preventing fluid flow upon decoupling of first and second fluid delivery tubes, wherein the first fluid delivery tube includes a reception outlet and the second fluid delivery tube includes an insertion outlet for insertion and coupling within the reception outlet, the reception outlet including a pair of arms pivotable outwardly from the reception outlet for decoupling the outlets and pivotable inwardly for coupling the outlets, one of the fluid delivery tubes including a valve means for opening and closing the one tube to fluid flow, the apparatus comprising a pair of ear means mounted to the one tube including the valve means, the valve means including a handle means pivotable between valve open and valve closed positions, the ear means being pivotably mounted to the one tube including the valve means for pivotable movement between a position interfering with pivoting of the arms and a position of noninterference with pivoting of the arms, the ear means being connected to the handle means of the valve means such that when the ear means is pivoted to the position of interference the valve means is simultaneously pivoted to the open position and when the ear means is pivoted to the noninterference position the handle means is simultaneously pivoted to the closed position.

2. The apparatus of claim 1 wherein the ear means comprises a pair of rigid shield means connected to each other by a yoke, the yoke being manually actuatable for simultaneous pivoting of the shield means and the handle means.

3. The apparatus of claim 2 wherein the shield means are contoured such that the shields gradually move during pivoting of the handle means between interfering and noninterfering positions.

4. The apparatus of claim 2 wherein the first fluid tube includes the reception outlet, the valve means and the ear means.

5. The apparatus of claim 4 wherein the arms are pivotable within a first plane and the ear means are pivotable within a second plane substantially perpendicular to the first plane.

6. The apparatus of claim 2 wherein the arms are pivotable within a first plane and the ear means are pivotable within a second plane substantially perpendicular to the first plane.

7. The apparatus of claim 2 wherein the shield means include flat inside surfaces and are mounted such that upon pivoting of the ear means to the interfering position the flat inside surfaces of the ear means are disposed closely adjacent the outside surfaces of the arm means when the arm means are pivoted inwardly to a coupling position.

8. The apparatus of claim 7 wherein the first fluid tube includes the reception outlet, the valve means and the ear means.

9. The apparatus of claim 7 wherein the arms are pivotable within a first plane and the ear means are pivotable within a second plane substantially perpendicular to the first plane.

10. The apparatus of claim 8 wherein the arms are pivotable within a first plane and the ear means are pivotable within a second plane substantially perpendicular to the first plane.

11. The apparatus of claim 7 wherein the shield means are contoured such that the shield means gradually move during pivoting of the handle means between interfering and noninterfering positions.

12. The apparatus of claim 11 wherein the arms are pivotable within a first plane and the ear means are pivotable within a second plane substantially perpendicular to the first plane.

13. The apparatus of claim 11 wherein the first fluid tube includes the reception outlet, the valve means and the ear means.

14. The apparatus of claim 13 wherein the arms are pivotable within a first plane and the ear means are pivotable within a second plane substantially perpendicular to the first plane.

15. The apparatus of claim 1 wherein the first fluid tube includes the reception outlet, the valve means and the ear means.

16. The apparatus of claim 15 wherein the arms are pivotable within a first plane and the ear means are pivotable within a second plane substantially perpendicular to the first plane.

17. The apparatus of claim 1 wherein the arms are pivotable within a first plane and the ear means are pivotable within a second plane substantially perpendicular to the first plane.

18. Apparatus according to claim 1 further comprising means for locking the handle means in the valve open position.

19. Apparatus according to claim 18 wherein the means for locking comprises a pin means manually slidable into and out of a locking aperture.

* * * * *